Jan. 10, 1928.

E. G. HALLSTROM ET AL 1,655,951

SAW SET

Filed Dec. 7, 1925

WITNESS:
Gust. Hjelm

INVENTORS
E. G. Hallstrom and
C. G. Nilson
BY H. J. Sanders
ATTORNEY.

Patented Jan. 10, 1928.

1,655,951

UNITED STATES PATENT OFFICE.

ERIK GEORGE HALLSTROM AND CARL G. NELSON, OF KEMMERER, WYOMING.

SAW SET.

Application filed December 7, 1925. Serial No. 73,746.

This invention relates to improvements in saw sets and its object is the provision of this type of tool that is simple in construction, positive and efficient in operation and cheap to manufacture.

With the foregoing and other objects in view the invention consists in the combination and arrangement of parts to be hereinafter fully described, pointed out in the appended claim and illustrated in the accompanying drawing which forms a part of this application and in which—

Like reference characters denote corresponding parts throughout the several views.

Figure 1:
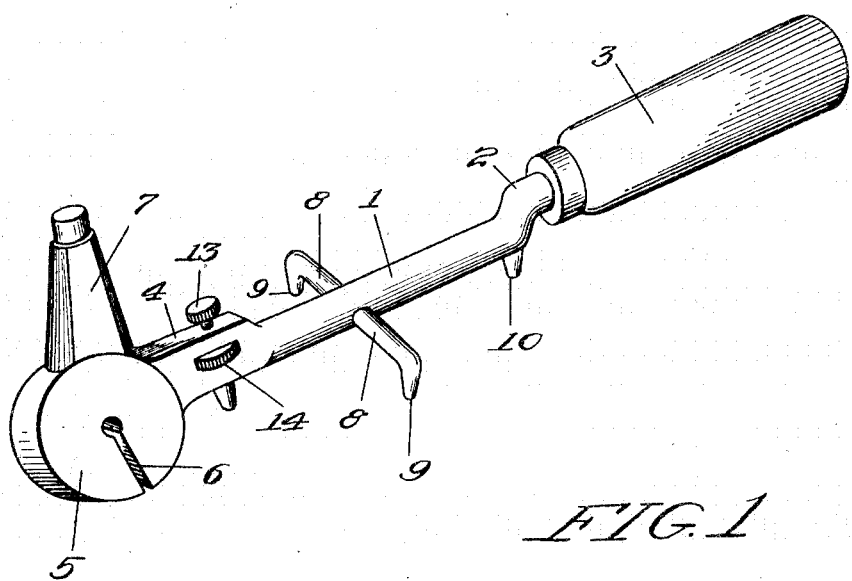
Fig. 1 is a perspective view of the tool.

The reference numeral 1 denotes the shank of the tool formed with the offset portion 2 at one end to receive the handle 3 and with the thickened neck portion 4 at its opposite end, said portion 4 being integral with the head 5 which is preferably disc shaped and formed with a radial recess 6 which is pitched at an angle to the neck 4 and which divides the head into jaw portions, one upon each side of the recess.

Integral with the head 5 is the tapered foot 7 that may be used for tapping, or administering light blows to, the saw teeth when desired or necessary to adjust them slightly relative to the blade.

A span bar 8 extends through the shank 1 and has its ends 9 downturned for contact, together with the lug 10, with the blade 11 of the saw as the angle or set of the teeth 12 is measured by the gauge screw 13 that extends through a perforation in the neck 4, a thumb disc 14 disposed in a transverse recess in said neck being fast upon the said screw 13.

Figure 2:
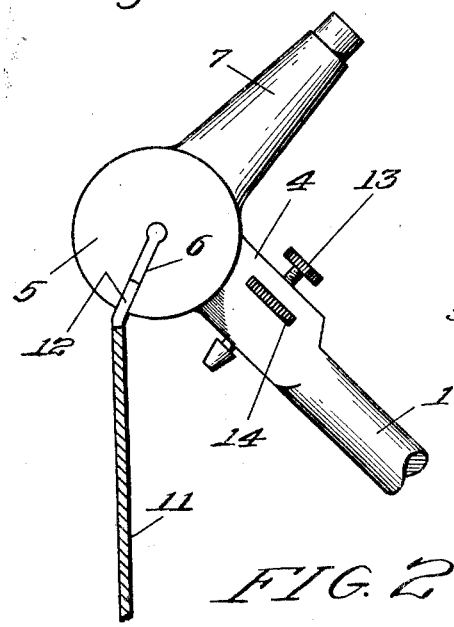
Fig. 2 is a fragmentary view of the tool illustrating its application.
Figure 3:
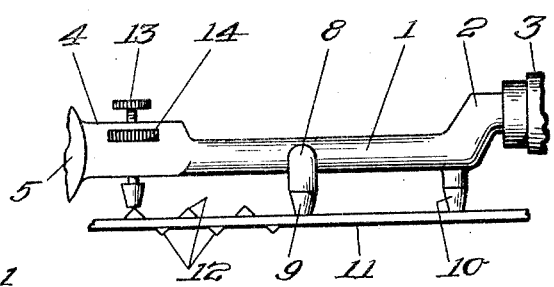
Fig. 3 is a fragmentary view of the tool illustrating the application of the gauge feature of the tool.

In operation the set of the tooth is determined by means of the gauge screw 13 while the saw blade is preferably in a horizontal position, and the bar ends 9 and lug 10 resting upon the blade. If the pitch or set of the tooth is too great or not sufficiently great the slotted portion of the head is applied to the tooth, as shown in Fig. 2, and the tooth bent toward or away from the blade as the case may be. An infinitesimal set may be given the tooth by lightly tapping it with the foot 7.

What is claimed is:—

In a saw set, a shank, a handle at one end thereof, a neck at the opposite end of said shank, a disc-shaped head integral with said neck and formed with a radial slot disposed at an oblique angle to said neck, a foot integral with said head, a gauge screw carried by said neck, a span bar extending transversely through said shank and having its ends downturned, and a lug carried by said shank for cooperation with said span bar, said lug and gauge screw being equidistant from said span bar and upon opposite sides thereof and lying in a straight line that cuts said span bar at right angles.

In testimony that we claim the foregoing as our own we have hereto affixed our signatures.

ERIK GEORGE HALLSTROM.
CARL G. NELSON.